March 16, 1954 A. FLEISCHER 2,672,495
SINTERED PLATE FOR NICKEL-CADMIUM SECONDARY BATTERIES
Filed Jan. 4, 1952
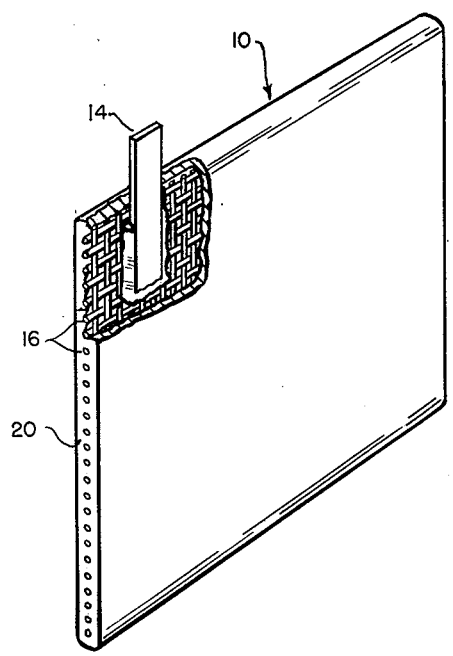
INVENTOR.
ARTHUR FLEISCHER
BY
Harry M. Saragovitz
Attorney Patented Mar. 16, 1954

2,672,495

UNITED STATES PATENT OFFICE 2,672,495

SINTERED PLATE FOR NICKEL-CADMIUM SECONDARY BATTERIES

Arthur Fleischer, Northampton, Mass., assignor to the United States of America as represented by the Secretary of the Army Application January 4, 1952, Serial No. 264,975

7 Claims. (Cl. 136—28)

The present invention relates to secondary nickel-cadmium batteries of the sintered plate type and more particularly to improvements in the construction of the sintered plates of such batteries.

There are three known types of nickel-cadmium batteries. The tubular type (similar to the nickel-iron Edison batteries), the flat plate construction (pocket type), and the sintered plate construction. The principal difference between the sintered plate construction and the others is that the sintered plate carries the active material in place of the grids of tubular and pocket constructions as used in the other types of batteries. The sintered plate construction provides more surface with which to carry the active material than the other types of constructions and is more highly desired.

Sintered plate nickel-cadmium batteries are characterized by greater mechanical strength and more simplified manufacturing procedure than exist with conventional types of nickel-cadmium batteries.

The sintered plate battery construction may be built up around a nickel plated steel mesh grid on which is sintered a nickel powder mixture to form a porous plaque. As is known in the art (see paper "Journal of the Electromechanical Society" vol. 94, No. 6, pp. 289-299 Sintered plates for nickel cadmium batteries, by Arthur Fleischer), the plaque may be impregnated with a nickel nitrate or a cadmium chloride solution and cathodically electrolyzed in a caustic solution opposite a pure nickel or a pure cadmium electrode, depending upon the polarity of the plate (plate refers to the plaque after impregnation with active mass). The plates may be fabricated in a conventional manner to make up a battery (see paper referred to above). An electrolyte consisting of a 25% KOH solution, containing lithium hydroxide may be used to fill the battery. If necessary, further known formations and treatments may be employed. The battery casing may consist of a light weight plastic casing such as polyvinyl chloride.

An object of this invention is to provide a lightweight plaque for sintered plate type nickel-cadmium secondary batteries.

A further object is to provide a sintered plate for nickel-cadmium secondary batteries that has an exceptionally high ampere-hour rating per unit weight of battery.

Other objects will become apparent from the description and claims that follow.

In one form the present sintered plate consists of the reaction product of a mixture of carbonyl nickel powder and from between about 10% to about 30% by weight of graphite. In another and preferred form, the sintered plate has a porosity of about 80% (corrected for the presence of a grid).

This invention further provides in a nickel-cadmium secondary battery, a sintered plate containing a major portion of nickel and a minor portion of graphite. The material is usually formed and sintered about a nickel plated screen grid in such a manner as to fill all of the interstices within the grid and to cover all of the exposed surfaces of the grid. The process of preparing a sintered plate from the herein disclosed nickel-graphite mixtures is also a part of this invention. Natural graphite is preferred for use in this invention.

The invention will be more clearly disclosed with reference to the appended drawing, wherein the figure shows a perspective section view of a sintered battery plaque in accordance with this invention.

The plaque 10 consists of nickel plated screen grid 16 to which is affixed an electrical terminal lug 14. All exposed surfaces of plaque 10 are coated with sintered mixture 20 of nickel and graphite. Mixture 20 also fills the interstices of grid 16.

Suitable plaques for secondary nickel-cadmium batteries may be prepared in a graphite form made by machining a suitable cavity in a graphite plate 1 inch in thickness and provided with a graphite cover plate of the same thickness. In accordance with one method in which the above procedure is followed the cover plate is held in place by suitably located pins. In making the compact the desired amount of nickel powder (generally carbonyl nickel powder or in accordance herewith a graphite nickel powder mixture) is weighed out and about half of this powder is placed in the cavity of the form and spread with a brass scraper to form a smooth layer. A grid is then placed on the smooth layer and is covered by sifting powder from a small hand container made of 40 mesh wire cloth. Enough powder is added to fill the cavity. The powder is leveled with a brass tool and excess powder is removed. The cover is then placed in position and the compact is ready for sintering.

Sintering of the compact, in accordance with one procedure, is accomplished in an 8 kw. sintering furnace provided with a cooling chamber and means for maintaining an atmosphere of dissociated ammonia or nitrogen. The furnace temperature is measured and controlled by a pyrometer controller. The thermocouple is located in the gas space. The graphite form is then transferred into the furnace. The transfer is made immediately after the controller opens the heating circuit of the furnace. After the desired interval, which is commonly ten minutes at about 500° C. for the most common plaque sizes, the graphite form is pushed into the cooling chamber which is also provided with the protective atmosphere. On removal from the cooling chamber, the plaque is inspected, trimmed especially to remove powder from the terminal lug, weighed and measured. The plaques are now ready for the next operation; namely, the introduction of the active material (nickel nitrate or cadmium chloride).

In accordance with one embodiment of the present invention the above procedure is held to except that, as above noted, a mixture of graphite and nickel powder is used in place of the commonly used nickel powder composition.

In a second embodiment of the present invention a layer of nickel powder (preferably carbonyl nickel) say of the order of 0.01 inch in thickness, is first sprinkled on the bottom of the graphite cavity form. After smoothing this layer, a mixture of carbonyl nickel and graphite powder (prepared in accordance with the composition of the graphite nickel powder employed in the first embodiment hereof) is applied. The grid is then inserted, more mixture applied and the surface smoothed. Next a thin layer of nickel powder is applied and smoothed and a graphite form cover applied. The laminated compact is then sintered in accordance with the previously discussed procedure.

It has been found in accordance with this invention that unlike other forms of carbon, graphite, and particularly natural graphite, may be added to the carbonyl nickel powder without reducing the electrical efficiency of the finished battery plate, and in fact that the addition of graphite reduces the overall weight of the complete battery for a given ampere-hour rating.

The plaques of the present invention may be used as either the positive or negative plate of a battery depending upon the manner in which it is treated before being inserted in the battery. The plaque may be constructed and sintered in accordance with the previously disclosed procedure.

Porosity, in accordance herewith, may be determined by the formula: percent porosity=100 (sp. gr.—apparent density)/sp. gr. or for nickel percent porosity=100 (8.9—apparent density)/8.9.

For a mixture of nickel and graphite the specific gravity should be calculated and ascertained in accordance with the percent of each element that is present in the mixture. The above formula holds true only for plaques without grids. When grids are used suitable correction may be made in accordance with known methods.

Apparent density here refers to the weight of the substance which fills a given space and this space occupancy under ordinary conditions will be the sum of the volumes of the individual particles and of the voids between the particles, generally air.

As many apparently widely different embodiments of the invention may be made without departing from the scope hereof, it is to be understood that the invention is not limited to its specific embodiments except as defined in the appended claims.

What is claimed is:

1. A process for making a sintered plaque for nickel-cadmium secondary batteries, said process comprising preparing a mixture of a major portion of carbonyl nickel powder and a minor portion of graphite, providing a nickel plated screen grid, applying the mixture of carbonyl nickel powder and graphite to the surfaces of the grid, filling the interstices of said grid with said mixture, and sintering said mixture about said grid.

2. A process for making a sintered plaque for nickel-cadmium secondary batteries, said process comprising preparing a mixture of a major portion of carbonyl nickel powder and a minor portion of natural graphite, providing a nickel plated screen grid, applying the mixture of carbonyl nickel powder and natural graphite to the surfaces of the grid, filling the interstices of said grid with said mixture, and sintering said mixture about said grid.

3. A process for making a sintered plaque for nickel-cadmium secondary batteries, said process comprising mixing from between about 70% to about 90% by weight of carbonyl nickel powder, with from about 30% to about 10% by weight of natural graphite, providing a nickel plated screen grid, applying the mixture of carbonyl nickel powder and natural graphite to the surfaces of said grid, filling the interstices of said grid with said mixture, and sintering said mixture about said grid.

4. A process for making a sintered plaque for nickel-cadmium secondary batteries, said process comprising sprinkling a layer of carbonyl nickel powder on the bottom of a cavity form, sprinkling a layer of a mixture comprising a major portion of carbonyl nickel powder and a minor portion of graphite on said layer of carbonyl nickel powder, inserting a grid in said cavity form, sprinkling a layer of said mixture upon said grid, sprinkling a layer of carbonyl nickel powder upon said mixture layer, applying a cover to said form and sintering said laminated compact.

5. A sintered plate for a nickel-cadmium secondary battery, the sintered mixture of said plate containing from between about 70% to about 90% by weight of nickel and from between about 30% to about 10% by weight of natural graphite.

6. A sintered plate for nickel-cadmium secondary battery, said plate comprising a nickel plated grid the surfaces and holes within said grid being coated and filled with a sintered mixture containing between about 70% and about 90% by weight of nickel and between about 30% and about 10% by weight of natural graphite.

7. A sintered plate for a nickel-cadmium secondary battery, said plate containing the reaction production of a mixture of from between about 90% and about 70% by weight of nickel and from between about 10% and about 30% by weight of natural graphite and said plate having a porosity of about 80%.

ARTHUR FLEISCHER.

References Cited in the file of this patent

UNITED STATES PATENTS

| Number | Name | Date |
|---|---|---|
| 884,930 | Jungner | Apr. 14, 1908 |
| 1,955,115 | Drumm | Apr. 17, 1934 |
| 2,198,042 | Schlecht | Apr. 23, 1940 |
| 2,251,913 | Brennan | Aug. 12, 1941 |
| 2,544,112 | Schneider | Mar. 6, 1951 |

FOREIGN PATENTS

| Number | Country | Date |
|---|---|---|
| 21,402 | Great Britain | Feb. 23, 1905 |
| 653,235 | Great Britain | May 9, 1951 |